Dec. 28, 1965     T. C. COX     3,226,684
COMPUTER CONTROL APPARATUS
Filed Dec. 29, 1960     2 Sheets-Sheet 1

FIG. I.

INVENTOR
THEODORE C. COX
BY Edgar H. Kent
ATTORNEY

Dec. 28, 1965  T. C. COX  3,226,684
COMPUTER CONTROL APPARATUS
Filed Dec. 29, 1960  2 Sheets-Sheet 2

3,226,684
COMPUTER CONTROL APPARATUS
Theodore C. Cox, Rhinebeck, N.Y., assignor to International Business Machines Corporation, New York, N.Y., a corporation of New York
Filed Dec. 29, 1960, Ser. No. 79,315
18 Claims. (Cl. 340—172.5)

This invention relates to digital computers and like devices and more particularly to improved diagnostic apparatus especially useful for controlling the operation of the computer during maintenance periods as an aid in detecting improperly operating circuitry.

In the operation of large complex circuitry such as that used in a high speed digital computer controlled by a stored program of instructions it is not uncommon that a component failure may produce an error that is not detected until some later time. This time varies in accordance with the type of error checking equipment that is associated with the circuitry and also with the nature of the fault or failure which, if intermittent, may produce error alarms of one type, and if continuous, may produce error alarms of another type. In order to reproduce the condition that caused the error alarm, it often is essential to operate the circuitry at full speed but to stop it at a particular point or points so that an analysis of its operation may be made. Due to the exceedingly complex circuitry of some of the digital computers now being designed and built, for example, it is desirable that the maintenance personnel have available for their use apparatus which enables the cause of the error alarm or defective operation of the circuitry to be pinpointed with great accuracy, both as to the nature of the circuit failure and the time that it occurs. It is obvious that any equipment designed for these purposes should have the attributes of simplicity in design and operation and flexibility and versatility in the types of diagnostic operations that may be performed.

Accordingly, it is an object of this invention to provide improved diagnostic apparatus for digital computers and like devices that operate in acordance with a program of instructions which enable the devices to be repetitively cycled through any desired portion of the program.

Another object of the invention is to provide improved diagnostic circuitry which are adapted selectively to provide a variety of operations, useful for maintenance functions.

Another object of the invention is to provide diagnostic apparatus of this type which is arranged so that use of the apparatus for checking operations during normal computer operation is enabled.

Still another object of the invention is to provide a novel counter checking apparatus.

A further object of the invention is to provide diagnostic apparatus which enables operation of a digital computer operative in accordance with a stored program of instructions to be checked by repetitively cycling the computer through a selectable series of instructions in the program and to halt the operation of the computer at a particular time pulse so that the execution of those instructions and the status of the computer at the end of the series of instructions may be observed.

The apparatus of the preferred embodiment of the invention utilizes a counter (herein termed the maintenance counter) which has several different modes of operation: four cyclic modes, and two error responsive modes (hold program counter on alarm and hold address register on alarm) which are used principally during maintenance operations, and a combined error count-step counter check mode which may be used during normal computer operation. As the counter is time shared between controls only a single mode is available at any one time.

The principal function of the system is to control the cycling of the computer through any desired portion of its program a single time or repetitively, as desired. In addition the apparatus is adapted to store the contents of a selected register upon generation of an alarm signal. Such information is useful in diagnosing the fault that gave rise to the alarm.

In the normal mode, which is used at all times except when maintenance requires use of the diagnostic circuitry, a portion of the maintenance counter is used to check the step counter and another portion is utilized to count errors. The step counter is error checked with the maintenance counter through an arrangement which gives an output from each counter at substantially the same time in response to a series of input pulses. As the step counter counts down while the maintenance counter counts up the 2's complement of the number of shifts specified by the step counter is placed in the maintenance counter by clearing the counter, transferring in the 1's complement, and adding one prior to the shift pulse. Thus after the counters are cleared the required value is transferred in normal form to the step counter and in complement form to the maintenance counter. ONE is then added to the maintenance counter contents and then the shift pulses are applied to both counters simultaneously. The last shift pulse senses for a ONE in the stop counter and counts down to ZERO simultaneously. At the same time an end carry should result after the pulse ripples through the maintenance counter. If these outputs occur on the same step pulse no error will result. The circuit arrangement provides for delays involved in the types of the sensing of the operations of these two counters. If the end carry and count down to zero do not occur on the same time pulse an alarm will be gated to the appropriate sensing circuitry, first alarm register, etc. A second portion of the maintenance counter (which is available as the maintenance counter has more stages than the step counter) is used to count errors. This information may be useful if the operator wishes to know whether an error is continuous or intermittent and also desirable to know the number of errors that occur if the error is intermittent. Error inputs obtained from the alarm controls where all alarms are ORed together and step the second portion of the counter to provide a record of the number of error alarms generated.

In the diagnostic use of the system it is desirable to stop a maintenance program after a precise time pulse or program step has occurred. By observing the status of the indicators (neons in the preferred embodiment) of the various computer registers and other components the accuracy of the execution of a single command or a series of commands can be checked. In any of the cyclic subroutine modes starting and stopping points can be quickly and easily selected. The starting point is defined by an unconditional branch (BUC) or jump instruction which is specified by a manually selectable set of test memory switches. Address (program step) and pulse count switches are also set as desired and then the program from the specified starting point is initiated. During each machine cycle the specified termination address is transferred to the maintenance counter in complement form and then the actual value as determined by the contents of the selected register (either the address register or the program counter in the preferred embodiment) is transferred in normal form to the complement inputs of the maintenance counter. The contents of the maintenance counter are then sampled (serial sampling of the flip-flop) and if the contents of the register are identical with the selected value the timing pulse distributor is turned off and the time pulse control is transferred to the maintenance counter control. The complement value of the number of time pulses that have been selected are then transferred to the cleared maintenance counter. The maintenance counter then is stepped by time pulses for the specified number of time pulses at which time an end carry pulse is generated which terminates that operation. Maintenance control enables this selected routine to be terminated, repeated without delay or repeated with a fixed delay in the order of two seconds which enable the neons which indicate the status of the various registers in the computer to be observed.

In still another mode the system may be utilized to store the contents of a selected register on the generation of the first alarm. This mode permits the maintenance counter to accept transfers from the selected register and hold the contents of that register as they existed when the first alarm occurred.

Thus it will be seen that the apparatus of the invention provides a flexible diagnostic tool for trouble shooting and maintenance of digital computers and similar complex apparatus. The counter which is utilized in this system is arranged so that it can be time shared being used during the normal operation of the computer for error checking purposes and during maintenance operation of one of the several different applicable modes. The foregoing and other objects, features and advantages of the invention will be apparent from the following more particular description of a preferred embodiment of the invention, as illustrated in the accompanying drawings, in which:

Figure 1:
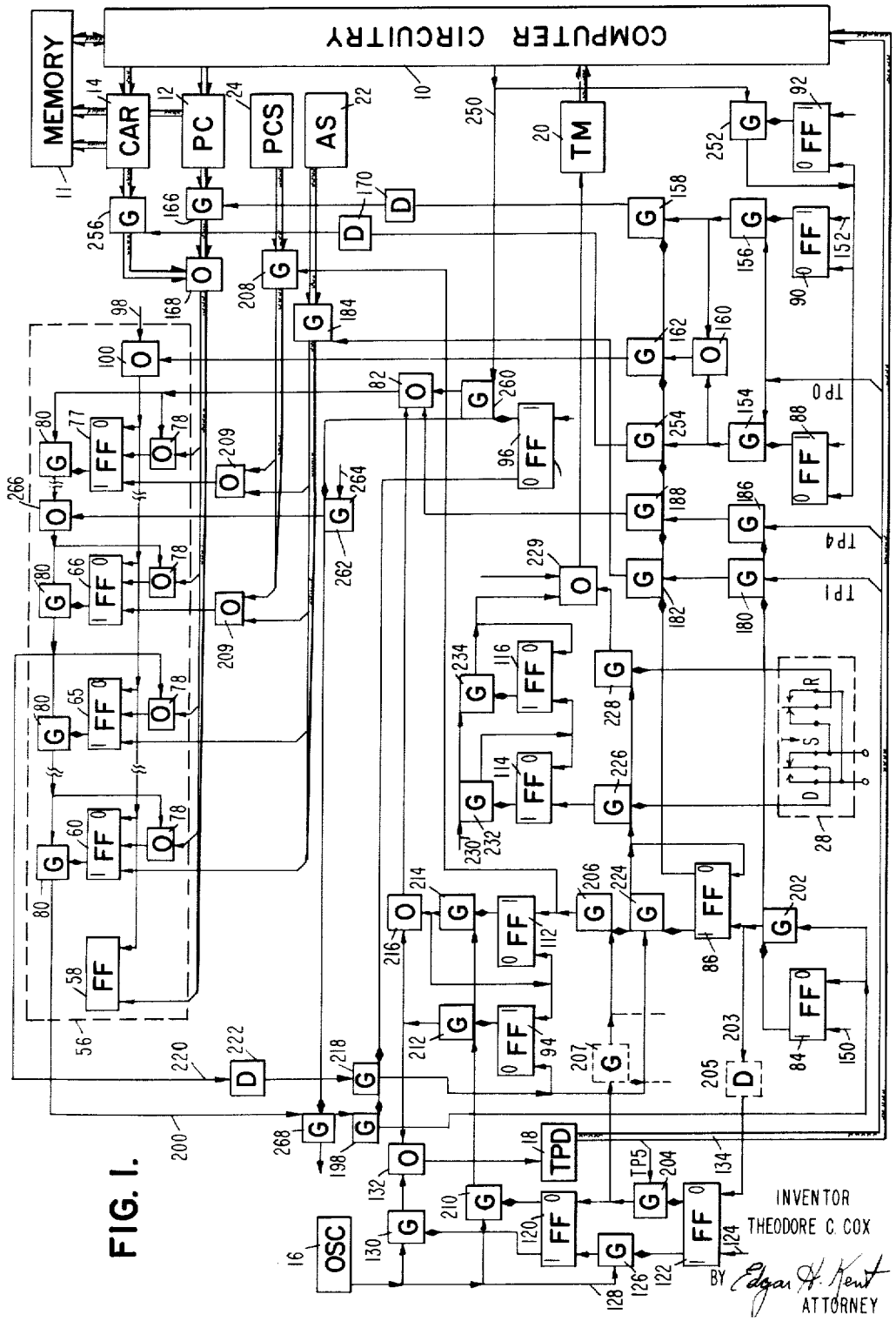
FIG. 1 is a logical block diagram of the maintenance counter, associated control circuitry and certain computer components utilized in the preferred embodiment of the invention.

In the logical block diagram figures of the drawings, a conventional arrowhead is employed on lines to indicate (1) a circuit connection, (2) energization with a pulse, and (3) the direction of pulse travel. A diamond-shaped arrowhead indicates (1) a circuit connection, (2) energization with a D.C. level, and (3) direction of application of that level. Bold face characters appearing within a block identify the common name of the circuit represented, that is, FF designates a flip-flop, G a gate circuit, O a logical OR circuit, etc. A variety of circuits suitable for performance of each of these functions is known in the art. However, specific examples of suitable component circuits are disclosed in the copending application Serial No. 824,119 filed in the name of Carroll A. Andrews et al. on June 30, 1959, and entitled, Magnetic Core Transfer Matrix (IBM Docket 13075). The basic arrangement of computer logic utilized in the preferred embodiment is similar to that of the computer system disclosed in the U.S. Patent No. 2,914,248 issued to H. D. Ross et al. on November 24, 1959 and a detailed disclosure of a prototype computer system may be found in the copending application, Serial No 79,809 (IBM Docket 13073x).

The invention is applicable to a wide variety of digital computers and similar types of devices, and details of such circuitry which are unnecessary to an understanding of the invention have not been shown in the drawings. The computer circuitry is generally indicated by the block 10 in FIG. 1. The operation of this computer is under the control of a stored program of instructions, each instruction having a first portion which specifies the operation to be performed and a second portion which specifies the address of the data to be manipulated in accordance with the instruction. The address of the next instruction in memory 11 is normally specified by the program counter (PC) 12 and the address of the data required by the instruction is specified by the address register (CAR) 14. The program counter, after instruction has been read from the memory in accordance with the contents thereof, is normally stepped to specify the next instruction. The instruction read from the address specified by the program counter is transferred into the computer circuitry with its operand portion setting up circuitry for the specified data manipulation and the address portion optionally being modified and then loaded into the address register 14 from which it may be used as the actual data to be processed or to specify the address of data to be processed. The execution of the instruction and required data manipulation is performed in response to pulses which are generated by an oscillator (OSC) 16 and channeled by a time pulse distributor (TPD) 18 for application to command generator circuitry that channels pulses throughout the computer circuitry to perform the requisite data manipulations in accordance with the operand portion of the instruction. Additional information relative to these computer operations in general and the type of data manipulations performed may be obtained with reference to the aforementioned patent and patent applications if desired.

Figure 2:
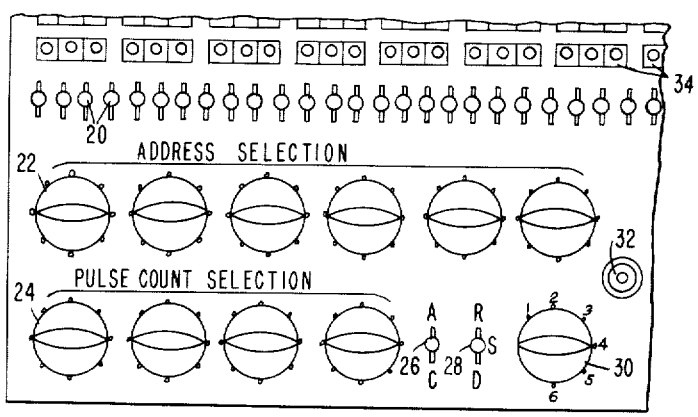
FIG. 2 is a diagrammatic layout of the switch panel at the operator's console, which is used to control the operation of the maintenance counter circuitry shown in FIG. 1.
Figure 3:
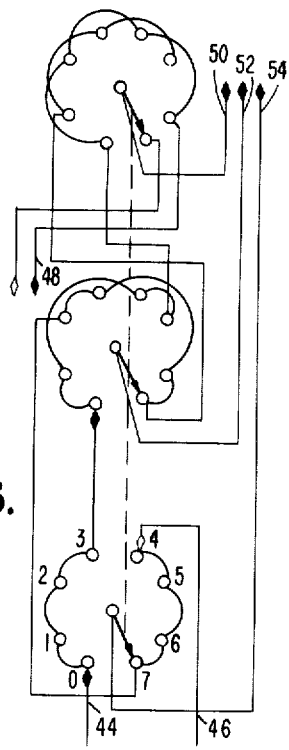
FIG. 3 is a schematic diagram of one of the switch units utilized to insert a desired value into the maintenance control circuitry.

Associated with the computer is a control panel which has a plurality of switches thereon. The layout of a portion of this control panel is indicated in FIG. 2. Included is a test memory switch register (TM) 20 which has forty-eight switches so that an instruction may be set by means of those switches, the left twenty-four switches specifying the operand portion of the instruction and the right twenty-four switches specifying the address of the instruction. Adjacent the test memory switches (only one bank of them being shown in FIG. 2) are address selection switches 22; pulse count selection switches 24; an activate switch 26; a three position recycle control switch 28; a mode switch 30 and a Start push button 32. In addition, an illustrative portion of the indicating neons 34 are also shown in FIG. 2. A layout of a typical address or pulse count selection switch unit is shown in FIG. 3. As indicated it has three ganged sections 36, 38 and 40 which are arranged so that the selector members 42 for the three sections move as a unit. —6.8 volts is applied to the line 44 (a return being provided on line 46) and is wired through the switch unit as indicated and then on line 48 to the adjacent switch unit. Depending on the position of the selector member binary coded signals are applied on the output lines 50, 52 and 54 to condition gates corresponding to the bit positions associated therewith in the maintenance counter 56. As the maintenance counter has eighteen bit positions (the relevant portions of the address register and the program counter also being eighteen bits in length) the leftmost switch applies binary coded levels to the first three (most significant) stages of the maintenance counter and the rightmost selection switch of binary levels to the last three (least significant) stages of the maintenance counter. These levels are the binary complement of the octal value indicated by the switch position. That is, the switch is set to indicate the octal value of the selected register that is to be compared but the complement of that value is transferred to the maintenance counter, as indicated in the following table.

| Switch setting: | Transferred levels |
|---|---|
| 0 | 111 |
| 1 | 110 |
| 2 | 101 |
| 3 | 100 |
| 4 | 011 |
| 5 | 010 |
| 6 | 001 |
| 7 | 000 |

As shown in FIG. 1 maintenance counter 56 includes a parity flip-flop 58 and counter flip-flops 60–77. The counter flip-flops in the actual embodiment are eighteen in number, only four of them being shown however. Associated with each counter flip-flop is an OR circuit 78 through which data is transferred to the complement input of the associated flip-flop and a gate circuit 80 which is conditioned when the flip-flop is set in the ONE state. A counting pulse is applied through OR circuit 82 to the least significant stage which simultaneously samples the gate 80 associated with that stage and complements that stage though the OR circuit 78. When all the flip-flops are in the ONE state an end carry is generated by a count pulse and the counter flip-flops are cleared. This end carry signal is utilized to indicate comparisons when operating in the maintenance mode.

In the control circuitry there is provided a cycle control flip-flop 84, a cyclic compare flip-flop 86, a transfer address register control flip-flop 88, a transfer program counter control flip-flop 90, an alarm stop flip-flop 92, a pulse count flip-flop 94 and an error counting control flip-flop 96. All of these flip-flops are cleared when the activate switch 26 is placed either in the clear or in the activate position. This switch is a three-position switch similar to the delay control switch illustrated in FIG. 1. When it is placed in the activate position a —6.8 level is applied to a pulse generator which clears the aforementioned flip-flops and then after a fixed delay the pulse produced by the pulse generator sets certain of the flip-flops in accordance with the setting of the mode switch 30 and in addition may clear the maintenance counter by a pulse on line 98 which is passed by OR circuit 100. The flip-flops are set in accordance with the position of the mode selection switch as indicated in the following table.

Mode selection switch position: FF
(1) Error count—step counter check — 96 (clear maintenance counter also).
(2) CAR—Hold on alarm — 88, 92.
(3) PC—Hold on alarm — 90, 92.
(4) CAR—Cyclic control — 84, 88.
(5) PC—Cyclic control — 84, 90.
(6) Spare.

Also associated with the control circuitry are pulse count synchronizing circuitry which includes flip-flop 112 and gates 212 and 214; and recycle delay control circuitry which includes flip-flops 114 and 116 and gates 226, 228, 232 and 234. The pulse count circuitry control generation of time pulses during the later portions of cyclic maintenance programs while the recycle delay control circuitry operate in response to the position of switch 28 to (a) terminate a cyclic maintenance program; (b) recycle the program without delay; or (c) recycle the program after a delay sufficient to observe or photograph the neons 34 which indicate the status of the multiplicity of registers and similar logic in the computer circuitry 10.

The oscillator 16 and time pulse distributor 18 has control circuitry which includes a continue-stop control flip-flop 120 and a continue-stop synchronizing flip-flop 122. In the normal mode of operation a continue pulse is applied on line 124 to set flip-flop 122 to the ONE state. This produces an output level which conditions gate 126. An oscillator pulse applied on line 128 is passed by conditioned gate 126 to set flip-flop 120 thereby conditioning gate 130 and permitting pulses to pass from the oscillator through gate 130 and OR circuit 132 to step the time pulse distributor. Time pulses 0–15 in each machine cycle are applied on cable 134 to the computer circuitry for controlling the operation thereof.

This circuitry operates to count errors and to check a counter during normal computer operation under the control of the set flip-flop 96 as will be described subsequently. However, a principal function of the equipment is to enable a selected program of instructions to be cycled through by the computer at full speed to a particular time pulse, with the selected program and terminal pulse easily variable. The initial intstruction is established by an unconditional branch instruction as set into the Test Memory Switch Register (TM) 20. A terminal instruction is specified by the setting of the Address Selection switches (AS) 22, and the number of time pulses beyond that instruction is specified by the setting of the Pulse Count Selection switches (PCS) 24. At the start of each instruction the maintenance counter 56 is cleared and then the desired terminal instruction value is transferred in complement form to the ONE inputs of the maintenance counter 56 when in a cyclic maintenance mode. The contents of a selected register (either the Program Counter 12 or the Address Register 14 (the contents of both of which are to address memories during the execution of the program of instructions) are then applied to the complement inputs of the counter flip-flop through OR circuits 78. If a comparison results all the significant flip-flops will be in the ONE state and a stepping pulse applied through OR circuit 82 will be passed as an End Carry and simultaneously clear the counter. This End Carry transfers time pulse generation control to the Maintenance Counter circuitry after the instruction has been completed and the complement of the specified pulse count is loaded into the Counter 56. The Counter is then stepped by each time pulse and operation of the cycled program is terminated on generation of a second End Carry. When in a Hold on Alarm mode the contents of a selected register are transferred into the Maintenance Counter during each machine cycle until the first alarm is generated after which all further transfers to the Maintenance Counter are inhibited even though the Computer circuitry 10 may continue operating.

In cyclic mode operation, after the desired value has been set into the address selection switches 22 the pulse count selection switches 24 are set to the desired number of pulses and the Delay Control Switch 28 and the Mode Control Switch 30 are appropriately set, the Activate Switch 26 is moved to the activate position. This sets certain flip-flops in the maintenance control, as indicated in the table above. The Start Test Memory from push button 36 is then depressed generates a pulse to start the Time Pulse Distributor at TP 6 by setting Sync flip-flop 122. An oscillator pulse is passed by conditioned gate 128 to set flip-flop 120 conditioning gate 130 to pass oscillator pulses through OR circuit 132 to step the Time Pulse Distributor. The first TP 0 pulse samples the gates 154 and 156 and is passed by the conditioned gate, through OR circuit 160 and gate 162 (conditioned by the cleared cyclic compare flip-flop 86) as a counter clearing pulse through OR circuit 100. Flip-flop 86 also provides a conditioning level to gates 158 and 254 and the TP 0 pulse is passed by one of those gates to transfer the contents of the specific register (12 or 14) through OR circuit 168 to the complement inputs of the maintenance counter 56. As the pulse that effects this transfer must travel 154 feet in the preferred embodiment the arrival of the contents of the specific register are delayed until approximately TP1 pulse 75 time. The delay has been diagrammatically indicated in FIG. 1 by the blocks 170.

The TP 1 pulse is passed by gate 180, conditioned by the set cycle control flip-flop 84 and by gate 182 which is conditioned by the cleared cyclic compare flip-flop 86 to transfer the complement of the value set in the address selection switches to the ONE inputs of the maintenance counter flip-flops. As indicated above, the contents of the selected register arrive approximately 75 millimicroseconds later.

At TP 4 time a pulse is passed by gates 186 and 188 through OR circuit 82 to step the counter and check for a comparison.

This counter clearing and comparing operation is repeated until the quantity transferred from the selected register is identical with the value set into the address selection switches 22: the maintenance counter being cleared during each cycle at TP 0 time, a selected address value being transferred at TP 1 time in complement form, the register contents being applied to the complement inputs at TP 1+75 time and the maintenance counter being stepped at TP 4 time in a comparison operation.

When the identity exists all the stages of the maintenance counter are set in the ONE state and the stepping pulse is passed through all the gates 80 to line 200 as an End Carry Pulse. The End Carry is passed by gate 198, conditioned by the cleared Check Mode flip-flop 96, and is passed by the gate 202, conditioned by the set cycle control flip-flop 84, and simultaneously clears that flip-flop. The passed pulse sets the cyclic compare flip-flop 86 and is applied on line 203 as a Compare indication pulse. This pulse will cause the continue-stop sync flip-flop 122 to be cleared at TP 3 of the next instruction-in cycle as diagrammatically indicated by delay 205. The following TP 5 pulse samples gate 205 and is passed to clear the continue-stop control flip-flop 120 and also is passed by the gate 206 as a TPD Stopped indicator pulse. (This pulse is gated at this time as indicated by gate 207 and the conditioning level is then removed.) Clearing the continue-stop flip-flop 120 removes the conditioning level from gate 130 so that the time pulse distributor is shut down and does not generate the TP 6 pulse. The pulse passed by gate 206 sets the pulse count sync flip-flop 112 and also samples gates 208 to transfer the complement value of the quantity set in the pulse count switches 24 through the OR circuits 209 to the ONE inputs of the maintenance counter flip-flops. With the clearing of the continue-stop control flip-flop 120 gate 210 is conditioned and oscillator pulses are applied to sample gates 212 and 214. As gate 214 is conditioned by the output level from the pulse count sync flip-flop it is passed through OR circuits 216 and 82 as maintenance counter stepping pulse. The pulse is also passed to clear the sync flip-flop 112 and to set the pulse count flip-flop 110. The next oscillator pulse is passed by gate 212 through OR circuits 216 and 82 as a maintenance counter stepping pulse and also through OR circuit 132 as a TPD stepping pulse, generating a TP 6 pulse.

When the Maintenance Counter 56 has been stepped so that it contains all ONE's in the lower twelve stages an end carry pulse, generated on line 220, delayed fifty millimicroseconds by delay unit 222 and gated by gate 218, is passed to clear the pulse count flip-flop 94 and by gate 224 conditioned by the set cyclic compare flip-flop 86 to sample the gates 226 and 228 associated with the recycle control switch. The pulse passed by gate 224 also clears the cyclic compare flip-flop removing the gate conditioning level. (There are additional pulses generated by the time pulse distributor before the flip-flop 94 is cleared after the end carry generating stepping pulse is applied to the maintenance counter due to circuit delays but this is a known delay which the operator can easily take into account and appropriately set the selection switches so that the computer will stop at the exact time pulse desired. The delay 222 is provided to insure no pulse splitting.)

If the recycle control switch is in the stop (S) position neither gate 226 nor gate 228 will be conditioned and the end carry pulse will terminate the cyclic operation by clearing of flip-flop 94 so that no further oscillator pulses will be applied to step the time pulse distributor.

If the recycle switch is in the recycle position (R) gate 228 is conditioned and the end carry pulse on line 220 is passed by gate 228 and OR circuit 229 so that the computer is immediately referenced to the starting instruction again as specified by the contents of the TM switch register 20, the time pulse distributor 18 is restarted at TP 6 and the operation is repeated immediately.

However, if the recycle switch is in the delay position (D) gate 226 is conditioned and the end carry pulse on line 220 is passed to set flip-flop 114. Pulses at one second intervals on line 230 sample gates 232 and 234. The first pulse is passed by conditioned gate 232 to clear flip-flop 114 and set flip-flop 116. The gate 234 is then conditioned and the next pulse one second later is passed to clear flip-flop 116 and also is passed by OR circuit 229 to repeat the cycle. This delay enables the neons 34 which indicate the status of flip-flop registers and other control equipment on the counter panel to be held at a stationary value for a sufficient time to be observed or to be photographed as desired and then the selected subroutine is reinitiated.

A simple abbreviated program that might be executed in the cyclic mode with reference to the program counter and with recycle delay is as follows:

| Instruction address | Instruction (mnemonic code) | Data address |
|---|---|---|
| 040000 | LDA | 000100 |
| 040001 | ADD | 000200 |
| 040002 | SUB | 000300 |
| 040003 | ADD | 000400 |
| 040004 | FST | 000500 |

The program is to be continuously repeated from the first instruction LDA to the first three time pulses in the FST instruction. The switch setup is as follows:

Mode selector switch 30 set to position five (cyclic control—program counter).

Address selection switches 22 set to 040003.

Pulse count selection switches 24 set to 0003.

Recycle control switch 28 set to delay recycle.

The unconditional branch instruction BUC 040000 as set in the test memory switch register 20.

Figure 4:
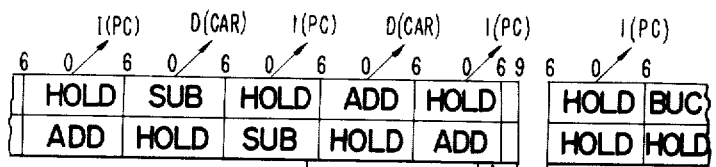
FIG. 4 is a timing diagram illustrating operation of the maintenance circuitry in one of the maintenance modes.

A layout in diagrammatic form of the cyclic program routine is shown in FIG. 4. In that diagram the sequence of instructions is illustrated at the end of one routine and the start of the recycling of the same routine. In the preferred embodiment the computer can operate in an overlap or nonoverlap mode. In the overlap mode an instruction is read from memory at the same time that the data specified by the preceding instruction is read from memory if there is no conflict in memory selection. Thus two instructions may be processed concurrently. Additional information relative to this mode of operation may be obtained with reference to the copending patent application, Serial No. 823,988, entitled Data Processing Machine, filed in the name of John D. Newton on June 30, 1959 (IBM D13074), if desired. In the nonoverlap mode only one memory reference is made by the computer during each machine cycle and for clarity this type of operation is illustrated in FIG. 4. Thus there are "holds" indicated where an instruction is not being processed at a given level. In the instruction control circuitry of this computer there are two instruction registers and associated command generator circuitry, the instruction being transferred into the first instruction register (first level) during the first cycle and then normally transferred to the second register (second level) during the next machine cycle, hence the two levels of operation are illustrated in FIG. 4. Memory references are made at 0 time and reading of data from memory is indicated by the upwardly extending diagonal line. In general, an instruction is to be read from a memory in accordance with the contents of the program counter 12 while data is read from a memory in accordance with the contents of the address register 14. The referencing element is indicated on the diagram of FIG. 4. Machine cycles commence at 6 time and memory cycles at 0 time as indicated in FIG. 4.

In operation the activate control switch 26 is moved to the activate (A) position and then released. This fires a pulse generator which produces a pulse to clear flip-flops 84, 86, 88, 90, 92, 94, 96 and then produces a delayed pulse that senses gates associated with the mode selection switch 30 to set the cycle control flip-flop 84 and the transfer program counter flip-flop 90.

The Start Test Memory push button 32 is then depressed and a pulse is generated which starts the TPD applying a pulse on line 124 to set the flip-flop 122. Oscillator pulses 126 set flip-flop 120 to condition gate 130. These oscillator pulses are then applied through OR circuit 132 to step the time pulse distributor 18. The contents of the test memory switch register are transferred to the program counter 12 and a memory reference is made from the program counter at 0 time to the address of the LDA instruction as specified by the branch instruction set in the Test Memory switches. At 0 time the TP 0 pulse also is passed by gates 156 and 158 to initiate transfer of the contents of the program counter 12 to the complement inputs of the maintenance counter flip-flops. Due to the distance the program counter is physically located from the maintenance counter as indicated above this value does not arrive until after TP 1 time. The TP 1 pulse is passed by gates 180 and 182 and transfers the value of the address selection switches (040003) through gates 184 in complement form to the one inputs of the maintenance counter flip-flops. Thus 737774 is stored in the maintenance counter. The complement input from the program counter which arrives next is 040000 and thus the contents of the maintenance counter become 777774. In other words all of the flip-flops are in the ONE state except the two least significant flip-flops. The TP 4 pulse is passed by gates 186 and 188 through OR circuit 82 as a maintenance counter stepping pulse to the complement input of flip-flop 77 and simultaneously samples the gate 80 associated with that flip-flop. As that flip-flop is in the ZERO state the pulse is not passed by gate 80 but the flip-flop is complemented to the ONE state.

This operation continues, the maintenance counter 56 being cleared by a TP 0 pulse, and transfer of the contents of the program counter being initiated by that pulse; the contents of the address selection switches levels being gated by a TP 1 pulse, and the maintenance counter being stepped by the TP 4 pulse. When the program counter contains the quantity 040003 which is the complement of 737774 (the value transferred from address selection switches) the maintenance counter will contain 777777 or all 1's. The maintenance counter stepping pulse then ripples through all of the gates 80 and is passed as an end carry pulse on line 200 and also leaves the maintenance counter in cleared condition. This pulse sets the cyclic compare flip-flop 86 and clears the cycle control flip-flop 84. The pulse is also transferred from the maintenance control to the time pulse distributor control section.

As indicated in FIG. 4, at this time (TP 4+the delay necessary for the count pulse to ripple through the counter) the end carry is generated but the add instruction has been read from the memory and will be executed (the maintenance compare pulse on line 203 setting the stop request flip-flop in cycle control (not shown).

The TP 3 pulse in the next instruction in cycle clears the continue-stop Sync flip-flop 122. (This operation is indicated not in detail but rather as a delay unit 205 indicated in dotted lines). The next TP 5 pulse is passed by the conditioned gate 204 to clear the continue-stop flip-flop 122 conditioning gate 210 and removing the conditioning level from gate 130. Oscillator pulses are then transferred to sample the pulse count control flip-flops 94 and 112. The time pulse distributor 18 is stopped at time pulse level 6. The MT 5 pulse passed by gate 204 is also gated by suitable means such as the stop request flip-flop as a TPD stopped pulse to sample gate 206 conditioned by the cyclic compare flip-flop 86 to transfer the complement (7774) of the pulse count selection switches 24 through gates 208 to the ONE inputs of flip-flops 66–77 of the maintenance counter 56. The TPD stopped pulse also removes the conditioning level from the gate 207 indicated by the dotted lines.

The next oscillator pulse passed by gate 210 gets through gate 214 to clear flip-flop 112 and set flip-flop 94. It is also applied through OR circuit 216 and OR circuit 82 as a maintenance counter step pulse which steps the maintenance counter to the value 007775. The next oscillator pulse is passed by gate 212 through OR circuit 132 as a TPD stepping pulse to advance the TPD and generate the TP 6 pulse and also through OR circuit 216 and 82 as a counter stepping pulse (to 007776). The next oscillator pulse (TP 7) steps the counter to 007777 and then the next pulse (TP 8) is passed by the gates 80 and generates an end carry pulse on line 220. This stepping pulse end carry on line 220 clears the pulse count flip-flop 94 too late to prevent the next oscillator pulse (TP 9) from stepping the maintenance counter (delay 222 being inserted to avoid pulse splitting) and is passed by gate 224 to clear the cyclic compare flip-flop 86 and samples the recycle control circuitry. As the recycle control switch 28 is set in the delay position gate 226 is conditioned and a pulse is passed to set flip-flop 114. The next pulse on line 230 is passed by gate 232 to clear flip-flop 114 and set flip-flop 116 and the following pulse is passed by gate 234 through OR circuit 229 to generate a Start Test Memory pulse which sets time pulse distributor 18 to time level 6 and transfers the contents of the test memory switch register 20 to program counter 12 for memory reference in normal fashion at 0 time. Thus the computer may be cycled at full speed in repetitive manner with (or without) delay through a maintenance program of any desired length or type and the computer stopped at an exact time pulse as selected by the operator.

The circuitry may also be used to store the contents of a selected register on the generation of an alarm signal. Where an error occurs multiple alarms may result as the computer is not stopped on the first alarm. In this mode of the preferred embodiment the contents of either the address register 14 or the program counter 12 may be stored for future reference in the maintenance counter 56 on this first alarm. The setup is similar to the maintenance mode –5– above described with the exception that when the activate switch is depressed (assuming mode selection switch in position 2—address register contents are to be stored) flip-flops 88 and 92 are set. During each machine cycle the circuitry has been transferring the contents of the address register to the maintenance counter 56 at the TP 0 time via gates 154, 254 and 256. It will be noted that the cycle control flip-flop 84 is not set in this mode and thus gates 180 and 186 are not conditioned so that no signals are transferred from either the address selection switches or the pulse count select switches. Thus the TP 0 pulse passed by gate 154 through OR circuit 160 and gate 162 clears the maintenance counter and then after the transmission time delay the contents of the address register 14 are transferred into the maintenance counter 56. The first alarm signal which is applied on line 250 samples gate 252 and is passed by that conditioned gate to clear flip-flops 88 and 92, locking up the maintenance counter. The contents of the Program Counter 12 may also be selected for transfer during each machine cycle. These registers are selected as they reference memory and often contain significant information for ascertaining the cause of an error. Of course it will be understood that the contents of other registers of interest may also be transferred in similar manner for maintenance purposes if desired through obvious circuit modification.

In the normal mode, which may be used when a computer is not in the maintenance mode, flip-flop 96 is set and the maintenance counter is cleared by a pulse on line 98. In this mode as illustrated alarm pulses on line 250 are passed by the conditioned gate 260 through OR circuit 82 to step the maintenance counter 56. In addition gate 262 is conditioned and the stepping pulses of a counter to be checked are applied on line 264. The output of that gate is supplied to an OR circuit 266 so that counter step pulses are applied to the seven most significant stages of the maintenance counter. The lower ten stages of the maintenance counter used for counting the number of errors that occur. Error counts up to $2^{10}$ thus may be recorded in the lower ten stages of the maintenance counter. Any additional error will result in setting the eleventh stage, flip-flop 67 and will clear the flip-flop 96. (This is merely a safety feature as it is most unlikely that $2^{10}$ errors would ever be generated without halting the computer. Of course if the counter being checked had more stages, less stages would be available for error counting purposes).

Figure 5:
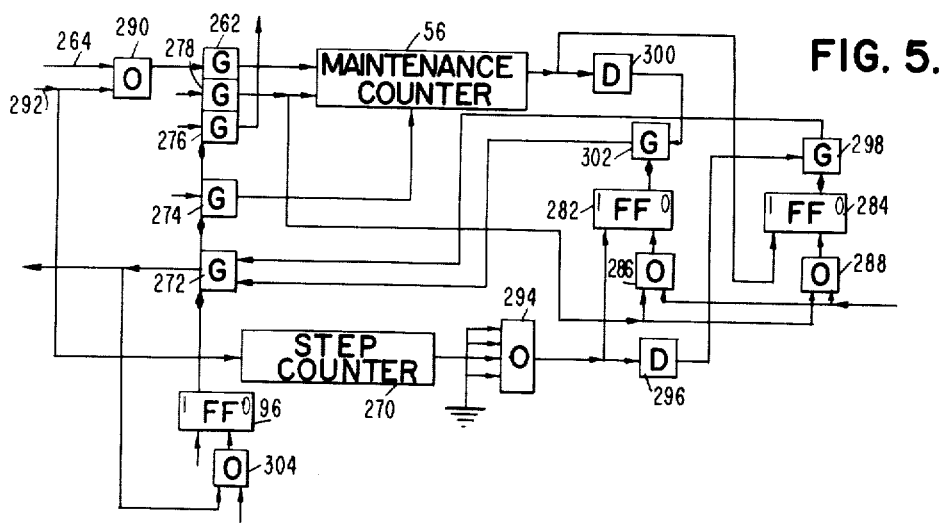
FIG. 5 is a logic block diagram of the counter checking circuitry which utilizes the maintenance counter in the normal mode of computer operation.

The seven most significant stages of the maintenance counter are used in this mode for checking operation of the step counter. The step counter 270 shown in FIG. 5 counts down while the maintenance counter 56 counts up, the step counter being used, for example, to control the number of shifts in multiplication operations. Thus two counters which are operable in the same radix but count in the opposite directions are involved in this checking operation. Operation is controlled by the flip-flop 96 which is set when the activate switch is operated. This conditions gates 272, 274, 276, 278 and 262. Associated with the circuitry are checking flip-flops 282 and 284. In operation, the maintenance counter is cleared by a TP 2 pulse passed by gate 278 which pulse also clears flip-flops 282 and 284 through OR circuits 286 and 288 respectively. A TP 3 pulse passed by gate 276 then transfers the complement of the contents of the step counter 270 to the maintenance counter. The contents of the maintenance counter are properly adjusted to the 2's complement value by an add 1 pulse passed by OR circuit 290 and gate 262 to step the counter in an add 1 operation. (In multiply operations which involve a fixed number of shifts the maintenance counter is preset to the proper number by a pulse passed by gate 274.)

A stepping pulse is then applied on line 292 to the maintenance counter 56 and to the step counter 270 simultaneously. The last shift pulse senses for a ONE in the last stage of the step counter and counts down to ZERO simultaneously, and should produce an end carry from the maintenance counter. The output pulse from the step counter 270 is applied through OR circuit 294 (which is shown as having additional inputs for checking other counters if desired) to set flip-flop 282 and after a fixed delay provided by circuit 296 samples gate 298 conditioned by cleared flip-flop 284. The end carry from the maintenance counter 56 sets flip-flop 284 and after a delay provided by delay unit 300 samples gates 302 conditioned by the cleared flip-flop 282. If either gate 298 or 302 passes a pulse the pulse is passed by gate 272 as an alarm pulse and also clears flip-flop 96 through OR circuit 304. In the preferred embodiment delay unit 296 provides 250 millimicroseconds delay and delay unit 300 provides 70 millimicroseconds delay. These values were selected as the maintenance counter end carry may occur from 32 to 102 millimicroseconds after the step counter output for the same input pulse.

An illustrative example of this check operation of the step counter is indicated in the following table in which the number five is transferred in true form to the step counter and in complement form to the maintenance counter:

|  | Step counter | Maintenance counter |
|---|---|---|
| TP 2 | 0000000 | 0000000 |
| TP 3 | 0000101 | 1111010 |
| Add one | 0000101 | 1111011 |
| Stepping pulse | 0000100 | 1111100 |
| Do | 0000011 | 1111101 |
| Do | 0000010 | 1111110 |
| Do | 0000001 | 1111111 |
| Do | ¹ 0000000 | ² 0000000 |

¹ Output.
² End carry.

Thus in a normal mode of operation the maintenance counter is utilized for the dual function of counting errors and for checking another counter which operates in the same radix notation. One counter steps up and the other counter steps down and they are fed in parallel from a single input pulse source. A check is made by comparing the carry out pulses from their highest order from both counters. It will be understood by those skilled in the art that the transmission time of the pulses to these counters from the pulse source should be substantially identical in order that the counters be stepped at approximately the same time as is necessary for accurate checking. When an error occurs the step counter check mode flip-flop is cleared, locking up the maintenance counter so that the contents of the maintenance counter can be read as that information may be helpful in diagnosing the source of the error. In addition a count of the errors generated during the normal operation of the computer are also stored in another portion of the maintenance counter. The operator thus may determine whether an error is continuous or intermittent, and also the number of errors that occur which may be significant if the error is intermittent. The stages of the maintenance counter that are not required for counter checking are utilized for this operation. It should be noted that when two alarms occur simultaneously only one error will be recorded but it has been found that most failures will produce several alarms so that a multiple error count will be indicated.

In the maintenance mode the apparatus provides a flexible diagnostic tool for maintenance personnel which enables the computer to be cycled one or more times through an easily selected and varied program of instructions with the computer being stopped at a particular time pulse. The computer stopping point may be easily changed merely by adjusting the pulse count switches at the control panel so that changes in operation of the circuitry for each additional pulse may be observed while the program is being executed at full speed. Such operation is often necessary to detect the failure which is intermittent or the result of a particular operating condition. The controls are simple and the maintenance counter, which is the central component of the circuitry, is arranged to provide these multiple time shared functions with a comparatively small amount of equipment.

While the invention has been particularly shown and described with reference to a preferred embodiment thereof, it will be understood by those skilled in the art that various changes in form and details may be made therein without departing from the spirit and scope of the invention.

What is claimed is:

1. Diagnostic apparatus for checking the operation of a digital computer operable in accordance with a stored program of instructions, said computer including means to generate a predetermined number of time pulses in each computer machine cycle, comprising first manually operable means to select a starting instruction in a program routine, second manually operable means to select a terminal instruction, third manually operable means to select a number of time pulses to be generated after the completion of said terminal instruction, means responsive to said first manually operable means to cause said computer to execute the instructions in said program routine at normal computer speed in a maintenance mode, and means responsive to said second and third manually operable means to halt the computer at the selected time pulse in the instruction immediately following said terminal instruction.

2. The apparatus as claimed in claim 1 and further including means to automatically and repetitively recycle the computer through said program routine from the selected starting instruction to the selected time pulse after the selected terminal instruction.

3. The apparatus as claimed in claim 2 and further including means to delay the initiation of each recycling operation after the generation of said selected time pulse so that the status of said computer at that point may be observed.

4. The apparatus as claimed in claim 1 wherein said apparatus includes a maintenance counter which comprises a plurality of bistable devices, each bistable device having a normal input and a complement input, means to apply the complement value of the terminal instruction to said counter during each machine cycle via the normal inputs of said bistable devices, means to apply information specifying the value of the current instruction being processed by the computer to the complement inputs of said bistable devices during each machine cycle and means to serially sample the bistable devices of said counter for a comparison after the terminal instruction and current instruction values have been applied thereto during each machine cycle, and means responsive to a comparison to apply the selected number of time pulses to said computer to continue the operation thereof.

5. The apparatus as claimed in claim 4 and further including means operative during the normal operating mode of said computer to check the operation of a second counter comprising means to step said maintenance counter and said second counter in response to stepping pulses from a single source and means to compare the time of end carry generation of each counter.

6. The apparatus as claimed in claim 5 wherein one of said counters counts down and the other counter counts up and further including means to set said one counter to a first value and means to set said other counter to the two's complement of said first value prior to the application of said stepping pulses to said counters.

7. Diagnostic apparatus useful in the maintenance of a digital computer operable to process binary coded data in accordance with a program of binary coded instructions, said computer including means to generate and distribute a predetermined number of time pulses in each computer machine cycle, comprising a counter, means to select three points in a program routine: a starting point, a coarse terminal point and a fine terminal point, control circuitry for starting said program routine at said selected starting point, means to operate said computer at full speed through said program routine to said coarse terminal point under the control of said time pulse distributing means, means to utilize said counter to compare the actual point in said program routine with said coarse terminal point during each machine cycle, means responsive to a successful comparison of said actual point and said coarse terminal point to transfer control of computer operation from said time pulse distributing means to said control circuitry and means to operate said counter to control the advance of said computer from said coarse terminal point to said fine terminal point in response to said control circuitry.

8. The apparatus as claimed in claim 7 wherein said maintenance control circuitry further includes means to automatically and repetitively recycle said computer through said program routine from said selected starting point to said selected fine terminal point.

9. The apparatus as claimed in claim 8 wherein said maintenance control circuitry further includes means to delay the initiation of each recycling operation after the computer has reached said fine terminal point so that the status of the computer at that point may be observed.

10. The apparatus as claimed in claim 7 wherein said computer includes means to generate alarms upon the detection of errors and said maintenance control circuitry includes optionally selectable means operative to cause said counter to receive information relative to the actual point of operation of said computer during each machine cycle and means to inhibit further transfers of actual point of operation information upon receipt by said maintenance control circuitry of the first alarm generated by said computer so that information of the actual point of operation of the computer at the time of generation of said first alarm is stored in said counter.

11. Apparatus for checking the operation of a first counter comprising a second counter operable in the same radix notation, one of said counters being adapted to count down and the other counter being adapted to count up, means to set said first counter to a first value, means to set the second counter to the radix complement value of said first value, means to apply stepping pulses from a single source to both counters and means to compare the times of said carry signal generation of each counter.

12. The apparatus as claimed in claim 11 wherein said comparison means includes a bistable device associated with each said counter, means to initially place each bistable device in a first state, means to place each bistable device in a second state in response to an end carry signal from the associated counter, means to delay each end carry signal for a time interval less than the interval between said stepping pulses, means to apply each delayed end carry signal to sample the bistable device associated with the other counter, and means to generate an alarm if the bistable device, when sampled by the end carry signal, is in said first state.

13. Diagnostic apparatus for use in the maintenance of a high speed digital computer operable to process binary coded data in acordance with a stored program of binary coded instructions, said computer including memory means to store said instructions and data and time pulse generating and distributing means to generate and distribute a predetermined number of time pulses in each computer machine cycle for normally controlling the processing of data in accordance with said instructions, comprising a counter having a plurality of bistable devices, manually operable means to select a portion of a program of instructions including a starting instruction and a terminal program step and to select a number of time pulses, maintenance control circuitry for initiating said selected program portion at said starting instruction and enabling said program portion to be processed to the completion of said terminal program step at normal computer speed as controlled by said time pulse generating and distributing means, means to transfer to said counter during each machine cycle the binary coded information contents of a register used to address said memory means and to transfer the selected terminal program step value to said counter during each machine cycle, means to utilize said counter to compare the contents of said register with the selected terminal program step value during each machine cycle, means responsive to a successful comparison to transfer control of the processing of data from said time pulse distributing means to said maintenance control circuitry and to transfer the selected time pulse number to said counter, and means to generate under the control of said counter and said maintenance control circuitry the specified number of pulses to advance the computer to the selected point and to halt the computer at that point.

14. The apparatus as claimed in claim 13 wherein said maintenance control circuitry further includes means to optionally select the program counter register and the address register, means to initially clear said counter during each machine cycle, means to transfer complement of said terminal program step value to the ONE inputs of said bistable devices, means to transfer the contents of the selected register to the complement inputs of said counter bistable devices and means to then apply a counter stepping pulse which serially samples the bistable devices and if passed by all the devices is indicative of a successful comparison.

15. The apparatus as claimed in claim 13 wherein said maintenance control circuitry further includes first optionally operative means to automatically and repetitively recycle the computer through said selected program portion and second optionally operative means to delay the initiation of each recycling operation after the completion of the specified number of time pulses so that the status of the computer at the point may be observed before recycling is initiated.

16. Diagnostic apparatus for checking the operation of a digital computer operable in accordance with a stored program of instructions,
   said computer being operable in a series of machine cycles and including means to generate a predetermined number of time pulses in each said machine cycle,
   comprising first manually operable means to specify a portion of said stored program of instructions including a starting instruction and a terminal condition,
   second manually operable means to specify a number of time pulses,
   means responsive to said first specifying means to cause said computer to execute the instructions from said starting instruction to said terminal condition at normal operation speed under computer time pulse distribution control,
   means to sense said terminal condition,
   means responsive to the sensing of said terminal condition to transfer time pulse distribution control to said second specifying means to generate the specified number of time pulses,
   and means to halt the computer immediately after the generation of said selected number of time pulses.

17. The apparatus as claimed in claim 16 wherein said terminal condition sensing means includes means operative during each said machine cycle to compare the selected terminal condition with each corresponding condition in the instruction executed during that machine cycle.

18. In combination, a source of pulses,
   a first counter connected to be driven by pulses from said source,
   and a checking apparatus comprising a second counter operable in the same radix as said first counter,
   said second counter driven by pulses from said source,
   means to set said second counter to the radix complement value of the value in said first counter,
   means to apply pulses from said source to step both counters substantially simultaneously,
   means to store an indication of carry output of each counter,
   means to delay the carry output of each counter to sample the storage indication of the other counter,
   and means to generate an alarm signal in the absence of a sensed stored carry indication by either delayed carry output.

References Cited by the Examiner

UNITED STATES PATENTS

| | | | |
|---|---|---|---|
| 2,815,168 | 12/1957 | Zukin | 235—157 |
| 2,959,351 | 11/1960 | Hamilton et al. | 235—153 |
| 2,996,248 | 8/1961 | Abbott | 235—153 |

ROBERT C. BAILEY, *Primary Examiner.*

WALTER W. BURNS, JR., MALCOLM A. MORRISON, *Examiners.*